United States Patent
Grossbach et al.

[11] 4,019,775
[45] Apr. 26, 1977

[54] SLIDING DOOR FOR VEHICLES, ESPECIALLY AUTOMOBILES

[75] Inventors: Alfred Grossbach, Tamm; Ralf Mertin, Sprockhovel, both of Germany

[73] Assignee: Lunke & Sohn GmbH, Witten (Ruhr), Germany

[22] Filed: Sept. 18, 1975

[21] Appl. No.: 614,647

[30] Foreign Application Priority Data

Oct. 7, 1974 Germany .......................... 2447698

[52] U.S. Cl. .................................. 296/155; 49/414
[51] Int. Cl.² ............................................ B60J 5/06
[58] Field of Search ............. 296/155, 146; 49/339, 49/345, 404, 405, 414

[56] References Cited
UNITED STATES PATENTS

| | | | |
|---|---|---|---|
| 3,608,957 | 9/1971 | Maneck | 296/146 |
| 3,708,192 | 1/1973 | Klebba | 296/146 |
| 3,758,990 | 9/1973 | Balanos | 296/146 |

FOREIGN PATENTS OR APPLICATIONS

| | | | |
|---|---|---|---|
| 2,119,209 | 11/1971 | Germany | 296/155 |
| 1,255,516 | 11/1962 | Germany | 296/155 |
| 2,025,406 | 5/1970 | Germany | 296/155 |

*Primary Examiner*—Joseph F. Peters, Jr.
*Assistant Examiner*—John A. Carroll
*Attorney, Agent, or Firm*—Toren, McGeady and Stanger

[57] ABSTRACT

A supporting arm and a rod, each having one end pivoted to a guide head in which a sliding door for a vehicle is longitudinally movable and the other end pivoted to a vehicle body, are of equal length so as to form a parallelogram linkage. The pivots of the supporting arm and the rod are offset relative to each other, accordingly, when the sliding door is opened to an intermediate position parallel with the vehicle body, it will move perpendicularly to the vehicle body.

3 Claims, 2 Drawing Figures

SLIDING DOOR FOR VEHICLES, ESPECIALLY AUTOMOBILES

BACKGROUND OF THE INVENTION

This invention relates to a sliding door for vehicles, especially automobiles, which is guided longitudinally slidable by a single, horizontally oriented guide bar extending substantially over the door length in a guide head pivotally journalled about a vertical axis on a supporting arm itself pivotally mounted about a vertical axis on the vehicle body, and which, during opening, is initially displaceable into an intermediate position parallel to its closure position and subsequently displaceable longitudinally of the vehicle, whereby the outward pivoting motion of the sliding door into its parallel, intermediate position is regulated by a rod fitted pivotally about parallel axes firstly to the vehicle body and secondly to the guide head.

In a sliding door construction of the above type, as known from our own earlier proposal U.S. Pat. No. 3,650,338, the outward pivotal motion of the sliding door into its parallel intermediate position and its inward pivotal motion into its closed position are regulated by means of a rod hinged firstly to the vehicle body and secondly to the guide head in such a manner that the front edge of the sliding door, both upon entry into its closed position and also upon outward movement into the intermediate position, describes a fairly flat movement curve differing from a pure circular path. In order to achieve this, the supporting arm which receives the guide head and the rod associated with the regulating of the inward movement are of different lengths, and are moreover journalled at different spacings of their pivotal axes. To facilitate opening of the sliding door and to ensure that it is securely fixed in the final opened position, in this known construction, the use of a spring force is additionally necessary, which is provided by a tensile spring attached to the vehicle body and acting on the guide head. During the practical testing of sliding doors of the type of construction initially referred to, it has been found that it is desirable for the movement of the door body away from the seal surrounding the door opening to be as perpendicular as possible, during the outward movement of the door into its parallel intermediate position, both in view of the dynamic conditions and also in view of a reduced wear of the door seal.

SUMMARY OF THE INVENTION

The problem underlying this invention is, for a sliding door of the type initially named for vehicles, especially automobiles, to create a supporting device, which shall ensure with minimum possible complication of construction, firstly a substantially perpendicular moving of the door body away from the door seal into its intermediate position during opening, and secondly an easy-running opening and closure motion for the door without the use of a spring force assistance.

This problem is solved according to the invention basically in that, in a sliding door of the type initially referred to, the hinge axes of the supporting arm and of the rod at the vehicle body side and guide head side constitute the corner points of a linkage rectangle, the supporting arm and the rod being of aqual lengths. Moreover, the hinge axes of supporting arm and rod at the vehicle body side and guide head side are each spaced at equal distances, so that the supporting device for the sliding door constitutes a parallelogram, which ensures, in the vicinity of the final closure position of the door, a movement of the door body oriented perpendicularly to the door seal. Compared with the previously proposed door construction, more favorable dynamic conditions are also obtained by the use of a linkage parallelogram for the supporting device of the sliding door.

According to a further feature of the invention, the hinge axes at the vehicle side, for the supporting arm and rod, are disposed offset with respect to the center of the vehicle from the corresponding hinge axes on the guide head, when the door is in the closed position. The body-side hinge axes are hereby favorably disposed offset, with respect to the vehicle center, from the guide-head-side hinge axes by such an amount that, when the door is in the closed position, the supporting arm and the rod are oriented at an angle of about 5° pointing outwardly from the longitudinal axis of the guide bar. This forwardly and outwardly pointing orientation of the supporting arm and rod relative to the longitudinal central axis of the guide bar leads to a breakdown of the forces acting upon the door both longitudinally of the sliding door and also transversely thereof, each into a longitudinally oriented and a transversely oriented component, whereby one of each of these components ensures a direct support or assistance either to the closure motion of the closing door or to the outward pivoting motion of the sliding door when moving outwards into its parallel intermediate position. As the door closes, the centrifugal force of the door entering its closed position, especially in the region of final closure, is broken down ito a forwardly oriented and a transversely oriented force component, whereby the component acting in the direction of closure assists the closure motion of the door in such a manner that any further spring force support or the like can be dispensed with, without prejudice to optimum easy motion of the door. Conversely, when the sliding door is situated in its closed position, the door seal exerts upon the door a force oriented initially perpendicularly to the door opening which, as a consequence of the orienting of the supporting arm and rod with respect to the longitudinal axis of the guide bar in accordance with this invention, can likewise be broken down into a force component acting longitudinally of the door and one oriented perpendicularly to the door opening, whereby in particular the force component oriented longitudinally of the door promotes the pivoting out of the supporting arm and thus the outward travel of the sliding door into its parallel intermediate position.

BRIEF DESCRIPTION OF THE DRAWINGS

The invention is described in more detail in the following description of an example with reference to an embodiment illustrated in the drawing. The drawing shows.

DETAILED DESCRIPTION OF THE INVENTION

Figure 1:
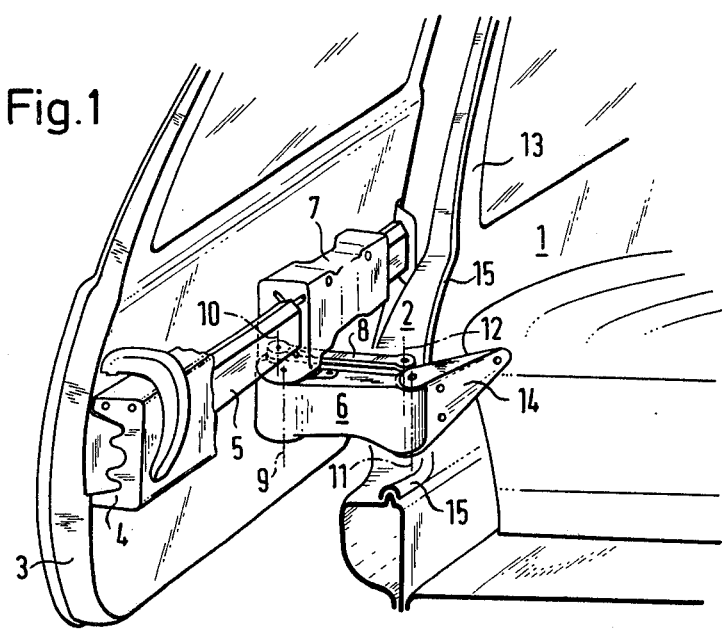
FIG. 1 a pictorial view of a sliding door according to this invention.
Figure 2:
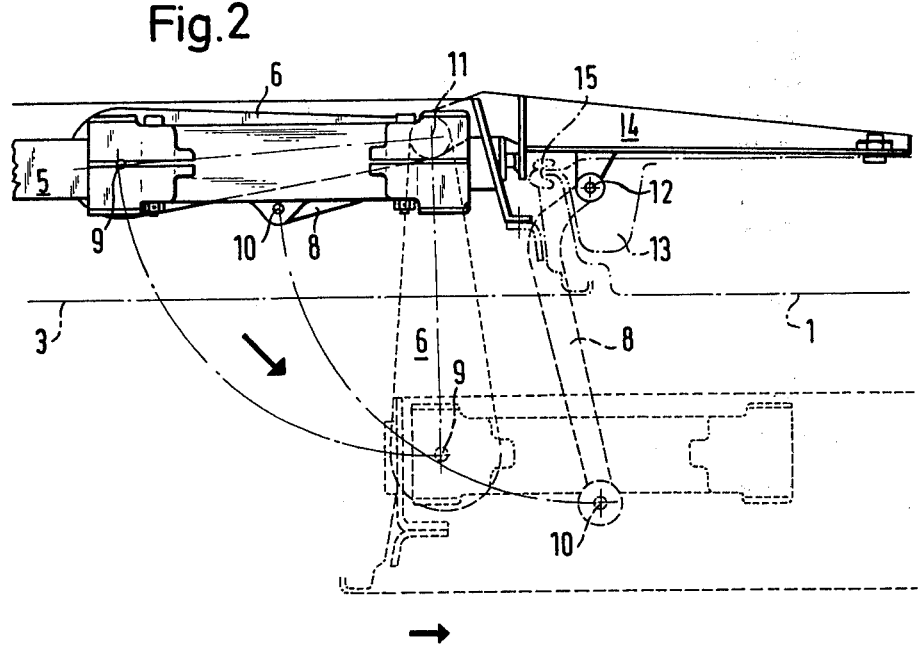
FIG. 2 a partial plan upon the supporting device of a sliding door constructed according to this invention for vehicles.

In a vehicle body designated generally as 1, the door opening 2 can be closed by means of a sliding door 3, whereby the sliding door 3 is slidably longitudinally guided by a guide bar 5 extending over the entire length of the door and attached to it by means of supporting components 4, in a supporting device which can be swung out perpendicularly to the door opening 2. The supporting device for the sliding door 3 consists essentially of a supporting arm 6 and a guide head 7, also of a rod 8, whereby the supporting arm 6 and the rod 8 are each hinged about parallel, vertical axes 9, 11 and 10, 12 respectively firstly to a bearing block 14 mounted on the vehicle body close to the door post 13 and secondly to the guide head 7. Thus the pivoting axes 11, 12 at the vehicle side and 9, 10 at the guide head side, of the supporting arm 6 and rod 8, constitute the corner points of a linkage rectangle, and the supporting arm 6 and rod 8 are of equal lengths. Furthermore, the distances between the pivoting axes 9 and 10 at the guide head side and the pivoting axes 11 and 12 at the vehicle body side are also equal, so that supporting device 6 to 12 constitutes a linkage parallelogram. As can be seen especially from the representation in FIG. 2, the vehicle side axes 11, 12 of the supporting arm 6 and rod 8 are moreover, when the door 3 is in the closed position, disposed offset with respect to the center of the vehicle from the guide head-side pivoting axes 9 and 10, so that when the sliding door 3 is situated in its closed position, the supporting arm 6 and the rod 8 are in parallel alignment and oriented pointing forwardly and outwardly from the longitudinal axis of the guide bar 5. In the example of the embodiment illustrated (FIG. 2), the vehicle-side pivoting axes 11 and 12 are disposed offset with respect to the vehicle center by such an amount that the supporting arm 6 and the rod 8, when the door is in its closed position, point forwards and outwards at an angle of 5° relative to the longitudinal axis of the guide bar 5.

When the sliding door is in its closed position, the door body 3 bears against a door seal 15 lining the door opening, which seal is constituted of a conventional door sealing strip and therefore, when the door is closed, exerts upon it a certain outwardly oriented restoring spring force.

We claim:
1. A sliding door assembly for motor vehicles mounting a vehicle door upon a generally vertically oriented side wall of a vehicle body for movement between a closed position flush with the side wall and an open position generally parallel to the side wall, said assembly comprising a horizontal guide bar affixed to said door and extending across the width thereof, a guide head slidably receiving said guide bar to enable relative sliding movement of said door, a horizontally extending parallelogram linkage system swivelly mounting said guide head upon said vehicle body, said parallelogram linkage system comprising a horizontal supporting arm having a pair of ends, a first pivot mounting one end of said supporting arm to said vehicle body, a second pivot mounting the other end of said supported arm to said guide head, a guide rod having a pair of ends, a third pivot mounting one end of said guide rod to said vehicle body, a fourth pivot mounting the other end of said guide rod to said guide head, each of said first, second, their and fourth pivots having a vertical pivot axis and arranged with the distance between said first and second pivots being equivalent to the distance between said third and fourth pivots and with the distance between said first and third pivots being equivalent to the distance between said second and fourth pivots.

2. An assemby according to claim 1 wherein the said door in the closed position flush with said vehicle body, said first and third pivots are located further inwardly of said vehicle body than said second and fourth pivots, respectively.

3. A system according to claim 2 wherein said guide bar is a generally longitudinal member having a horizontally extending longitudinal dimension and wherein with said door in a closed position a straight line extending between said first and second pivots and a straight line extending between said third and fourth pivots each will extend relative to said longitudinal dimension component at an angle of about 5° taken within a horizontal plane.

* * * * *